G. W. McGill,
Spike.
N° 65,497.  Patented June 4, 1867.
Fig: 1.
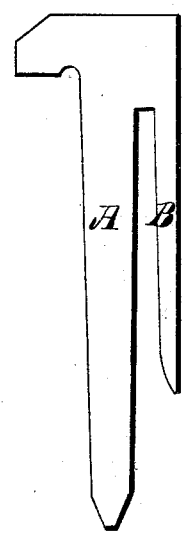
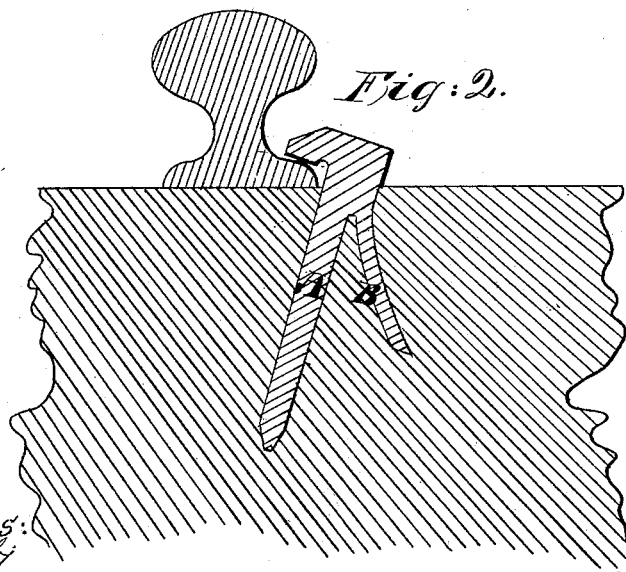
Fig: 2.
Witnesses:  Inventor:

United States Patent Office.

GEORGE W. McGILL, OF WASHINGTON, DISTRICT OF COLUMBIA.

Letters Patent No. 65,497, dated June 4, 1867.

IMPROVEMENT IN SPIKES.

The Schedule referred to in these Letters Patent and making part of the same.

TO ALL WHOM IT MAY CONCERN:

Be it known that I, GEORGE W. McGILL, of Washington city, in the county of Washington, and District of Columbia, have invented a new and useful Improvement in Railroad Spikes; and I do hereby declare that the following is a full, clear, and exact description thereof, reference being had to the accompanying drawings, and to the letters of reference marked thereon.

My invention consists in making a spike split into two prongs, one being longer and larger than the other, and the shorter and smaller prong being so bevelled at its point that on being driven into the wood it will diverge and spread from the main prong, and so secure the spike against becoming loose or drawing out. In the accompanying drawings—

Figure 1 is a view of the spike before being driven into the wood; and

Figure 2 is a sectional view of a railroad tie, a rail, and a spike driven into the tie.

When a spike of this kind is driven into the tie it should not be driven down perpendicularly, but should be driven so that its point will incline towards the vertical plane of the rail, as shown in fig. 2.

A is the longer and larger prong of the split spike, or the main prong, and B is the shorter and smaller prong, which is so bevelled at its point that in being driven into the wood it will assume the position shown in fig. 2. It thus forms a brace to prevent the head of the spike from spreading away from the rail, as well as a barb to prevent the withdrawal of the spike from the wood.

What I claim as my invention, and desire to secure by Letters Patent, is—

A split spike, having one prong longer and larger than the other, and the smaller and shorter prong so bevelled at its point that on being driven into the wood it will diverge and spread from the main prong so as to operate as a brace and barb, substantially as and for the purpose described.

GEORGE W. McGILL.

Witnesses:
    J. J. COOMBS,
    CLIFTON HELLEN.